Patented May 19, 1936

2,041,618

UNITED STATES PATENT OFFICE 2,041,618

CALCIUM-BASE LITHOPONE

Harold F. Saunders, Coffeyville, Kans., assignor to The Sherwin-Williams Company, Cleveland, Ohio, a corporation of Ohio No Drawing. Application November 23, 1933, Serial No. 699,429

1 Claim. (Cl. 134—78)

This invention relates to the production of a high strength, calcium-base lithopone.

Ordinary lithopone has a composition indicated by the formula $ZnS.BaSO_4$ in which there is theoretically present 29.4 per cent of ZnS. The commercial lithopone averages between 28–29 per cent of ZnS. Since the opacity or covering power of lithopone is contributed to it almost entirely by the ZnS it will obviously be of advantage to substitute for the inert portion, $BaSO_4$, a different inert of lower molecular weight, and such an inert is provided in $CaSO_4$. The normal corresponding calcium-base lithopone has a composition of $CaSO_4.ZnS$, contains approximately 41.7% ZnS, and consequently possesses considerably greater covering power. This added covering power makes the product distinctly attractive in the manufacture of paints and enamels where increase in covering is desired without additional weight of pigment in proportion to the oil used.

Calcium-base lithopone is usually referred to as "Sulphopone" in the literature and has been prepared in a manner analogous to that employed for lithopone, a solution of calcium sulphide being used instead of barium sulphide. The low solubility of calcium sulphide together with the difficulty in obtaining this article in a sufficiently pure state renders the process tedious and expensive. For these same reasons and because of the sensitivity of the material to adverse conditions in further processing, operations of washing, filtering and calcining, the product obtained is non-uniform, of rather poor color and unsatisfactory in its paint making properties.

The unavailability of a suitable non-setting calcium sulphate has heretofore prevented production of a calcium base lithopone by mechanical mixture of calcium sulphate and zinc sulphide. Attempts to use such mixtures have been unsatisfactory because they have been distinctly poor in color and carry into the paints made therefrom the undesirable characteristics of livering, separation through differential settling, poor body and painting flow.

I have found, however, that through the use of a specially calcined calcium sulphate prepared according to the methods set forth in my co-pending patent application Serial No. 699,564, filed November 24, 1933, a pigment of excellent paint properties may be prepared, having high color and opacity, and giving, when mixed with vehicles, paints and enamels possessing the desirable characteristics of superior covering strength, non-livering, high flow, and satisfactory body. Further, by varying the proportions in the mix, pigments of different ratio of ZnS to $CaSO_4$ may be obtained, thereby regulating not only the features of covering or opacity, soap formation, etc. contributed by the ZnS, but also those of "tooth", flatness, brushing, leveling, body, etc. contributed wholly or in part by the inert $CaSO_4$. This is accomplished without deterioration in color since the improved calcium sulphate referred to possesses a satisfactory color of its own, and is improved in opacity, texture and miscibility through calcination of hydrated calcium sulphate at a temperature of from 650° C. to 850° C.

A number of ways of effecting an intimate mix of the zinc sulphide with this improved calcium sulphate are possible within the scope of this invention.

Suitable predetermined proportions of zinc sulphide pigment and improved calcium sulphate pigment may be mixed together in the dry, or they may be stirred together in water and the pigment then separated again by filtration, drying and pulverizing. In my preferred practice for the manufacture of a product to contain approximately 50% of ZnS, I mix 53 parts by weight of a zinc sulphide pigment carrying 96% actual ZnS with 47 parts by weight of the improved calcium sulphate pigment in a tumbling device such as a tube mill arranged for continuous feed and discharge. The well mixed product as discharged is then conveyed to and fed continuously into a high speed hammer mill provided with air separating accessories wherein a very complete and intimate mixture is effected, the product from the mill being absolutely uniform so that any one sample will show an identical composition to any other.

As an alternative method 47 parts by weight of the same calcium sulphate pigment is added to a tank provided with an efficient stirring device and containing 150 parts by weight of water. 53 parts by weight of the zinc sulphide pigment is then added and the whole agitated until the mass is uniform. The slurry is then pumped through a filter press to remove a substantial proportion of the water and the cake remaining in the press removed. The cake is dried and disintegrated to a powder sufficiently fine that practically all will pass through a 325 mesh screen.

Pigments containing higher or lower percentages of zinc sulphide may be prepared in the same procedures by varying the proportions in the mix. Thus for a pigment to contain 75% of ZnS, and, consequently, having a greater opacity than that of the 50% ZnS pigment, I use 79½ parts of the zinc sulphide pigment carrying 96% of actual ZnS with 20½ parts of the improved calcium sulphate pigment. Any desired ratio of ZnS to CaSO$_4$ may therefore be obtained but for general purposes the product to obtain approximately 50% ZnS as first described appears to be best adapted, as carrying the best balance of properties.

As will be understood the figures and methods of mixing set forth are examples as of my preferred practice and are not to be considered as limiting the scope of the invention, since other well known means of effecting a mix, or an original zinc sulphide pigment carrying a greater or less percentage of actual ZnS may be used within the scope of the invention as defined in the appended claim.

Having thus described my invention, I claim:

A compound pigment composed of an intimate mixture of calcined zinc sulphide pigment with calcium sulphate pigment which prior to admixture has been calcined at a temperature of from 650° C. to 850° C.

HAROLD F. SAUNDERS.